(12) United States Patent
Uki

(10) Patent No.: US 9,731,587 B2
(45) Date of Patent: Aug. 15, 2017

(54) VEHICLE INCLUDING VIBRATION REDUCER

(71) Applicant: YAMAHA HATSUDOKI KABUSHIKI KAISHA, Iwata-shi, Shizuoka (JP)

(72) Inventor: Takashi Uki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/134,647

(22) Filed: Apr. 21, 2016

(65) Prior Publication Data

US 2016/0311302 A1    Oct. 27, 2016

(30) Foreign Application Priority Data

Apr. 23, 2015 (JP) ................. 2015-088671

(51) Int. Cl.
| | |
|---|---|
| *B60K 5/12* | (2006.01) |
| *B62D 21/18* | (2006.01) |
| *B60K 5/04* | (2006.01) |
| *F16F 15/08* | (2006.01) |
| *B60K 5/00* | (2006.01) |

(52) U.S. Cl.
CPC .......... *B60K 5/1216* (2013.01); *B60K 5/1241* (2013.01); *B62D 21/183* (2013.01); *B60K 5/04* (2013.01); *B60K 2005/003* (2013.01); *F16F 15/08* (2013.01)

(58) Field of Classification Search
CPC .. B60K 5/1208; B60K 5/1216; B60K 5/1266; B60K 5/1241
See application file for complete search history.

(56) References Cited

U.S. PATENT DOCUMENTS

| | | | |
|---|---|---|---|
| 7,819,220 B2 | 10/2010 | Sunsdahl et al. | |
| 2013/0048407 A1* | 2/2013 | Kuramoto | B60K 5/02 180/292 |

* cited by examiner

*Primary Examiner* — Erez Gurari
(74) *Attorney, Agent, or Firm* — Keating and Bennett, LLP

(57) ABSTRACT

A vehicle includes a frame supported by a pair of front wheels and a pair of rear wheels; a seat supported by the frame; an engine disposed behind the seat; a mounting support provided between the engine and the frame, at a lower position that is lower than a center of the engine in an up-down direction; and a vibration reducing member provided between the engine and the frame, at a higher position that is higher than the center of the engine in the up-down direction. The vibration reducing member includes a torque rod extending in a direction perpendicular or substantially perpendicular to a crank shaft when the vehicle is viewed in a plan view; and a rubber damper provided at each end of the torque rod.

12 Claims, 16 Drawing Sheets

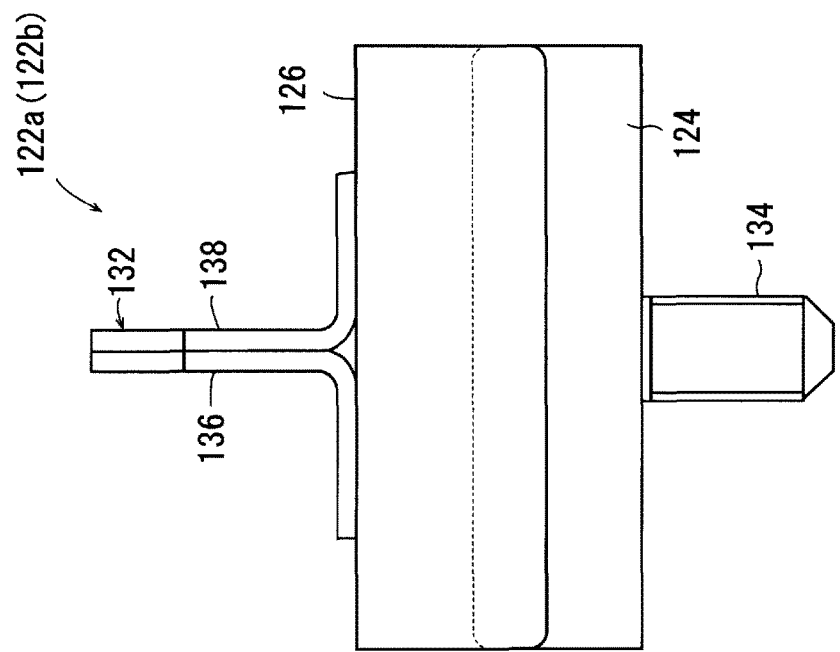
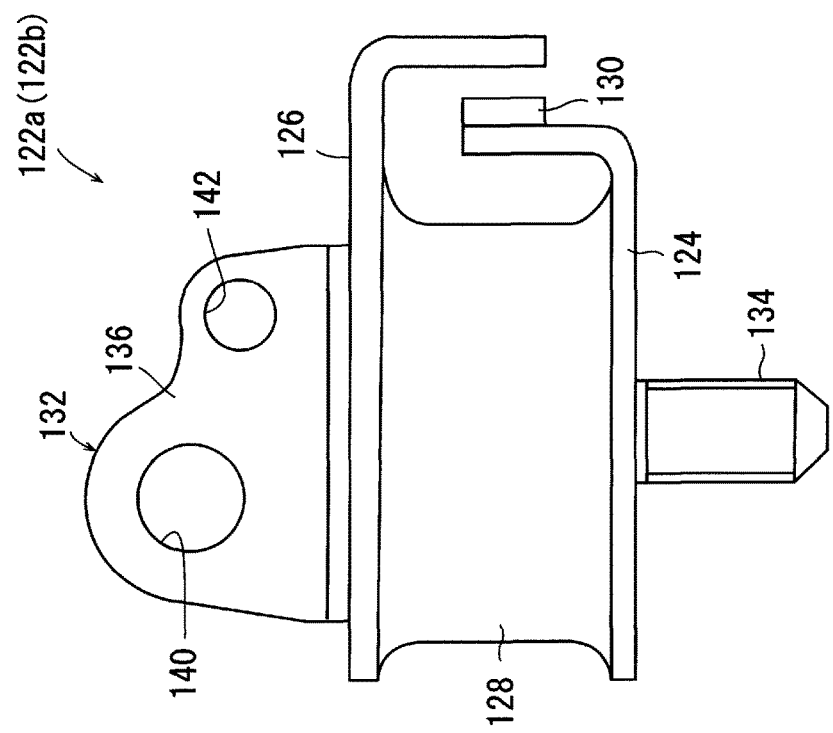

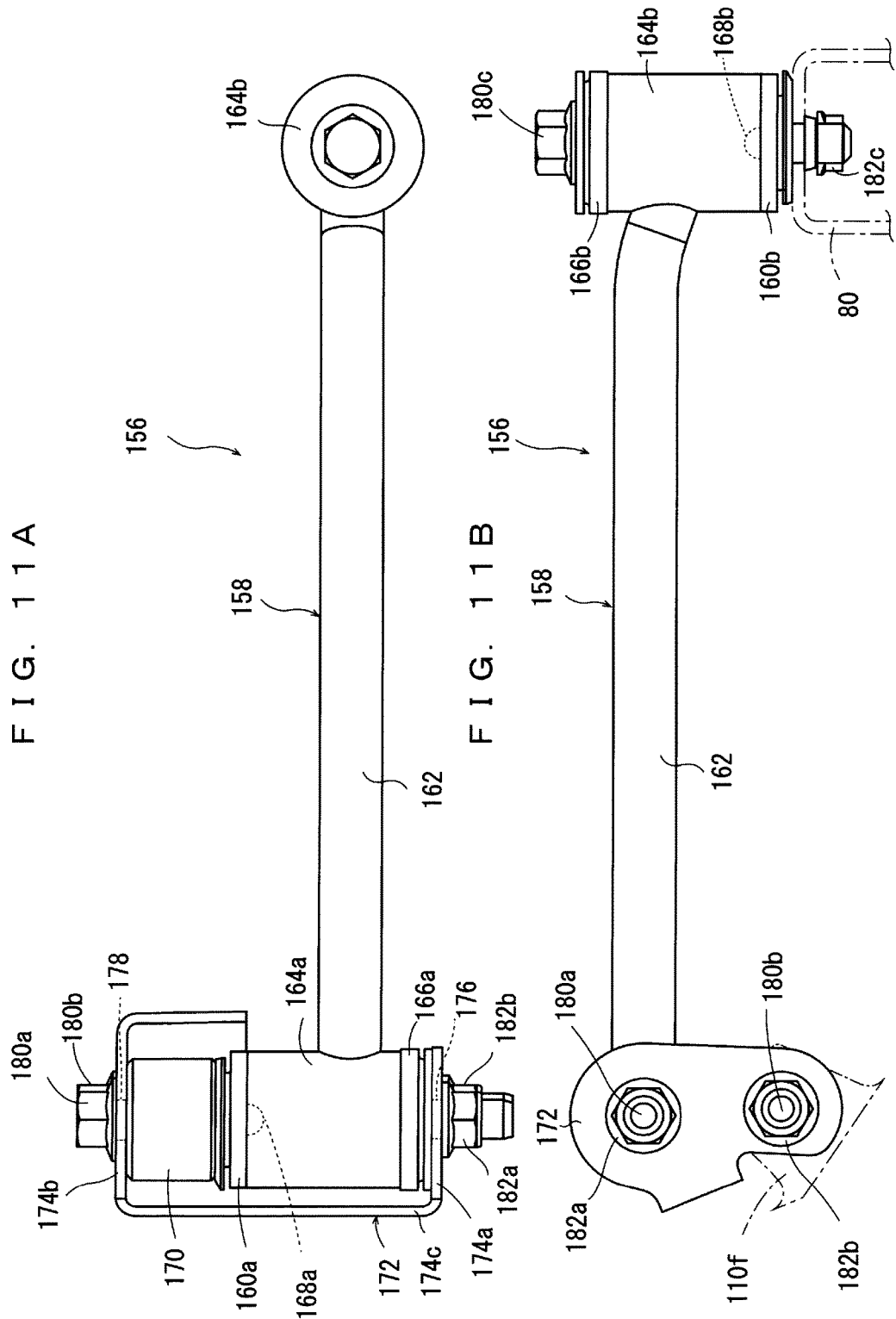

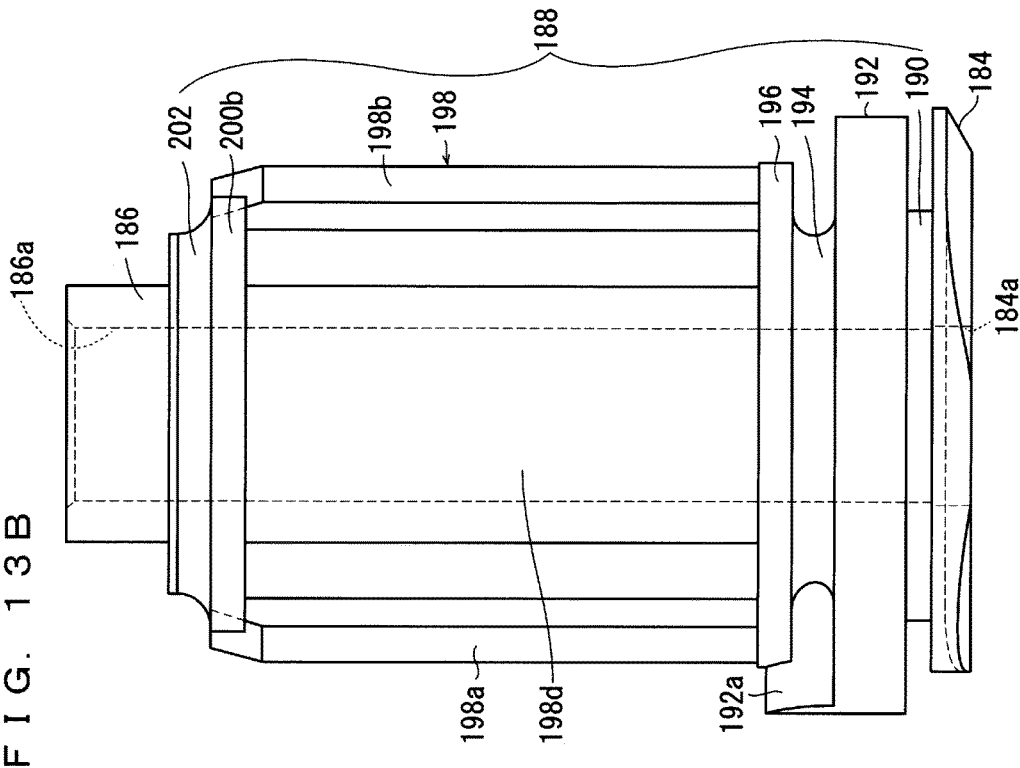
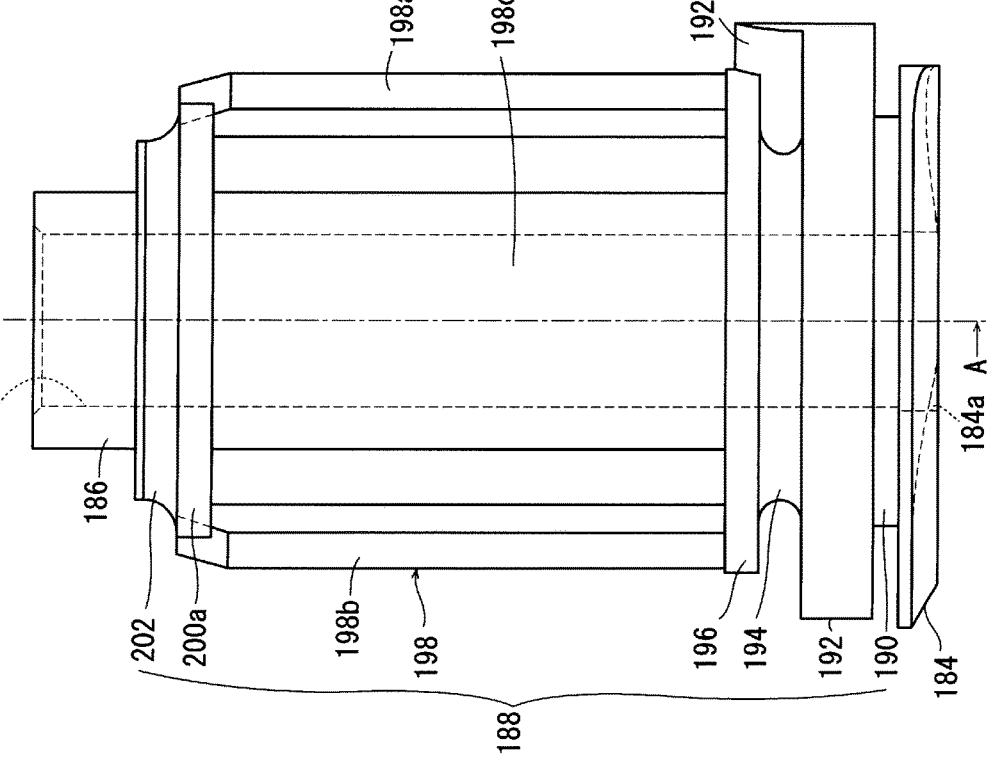

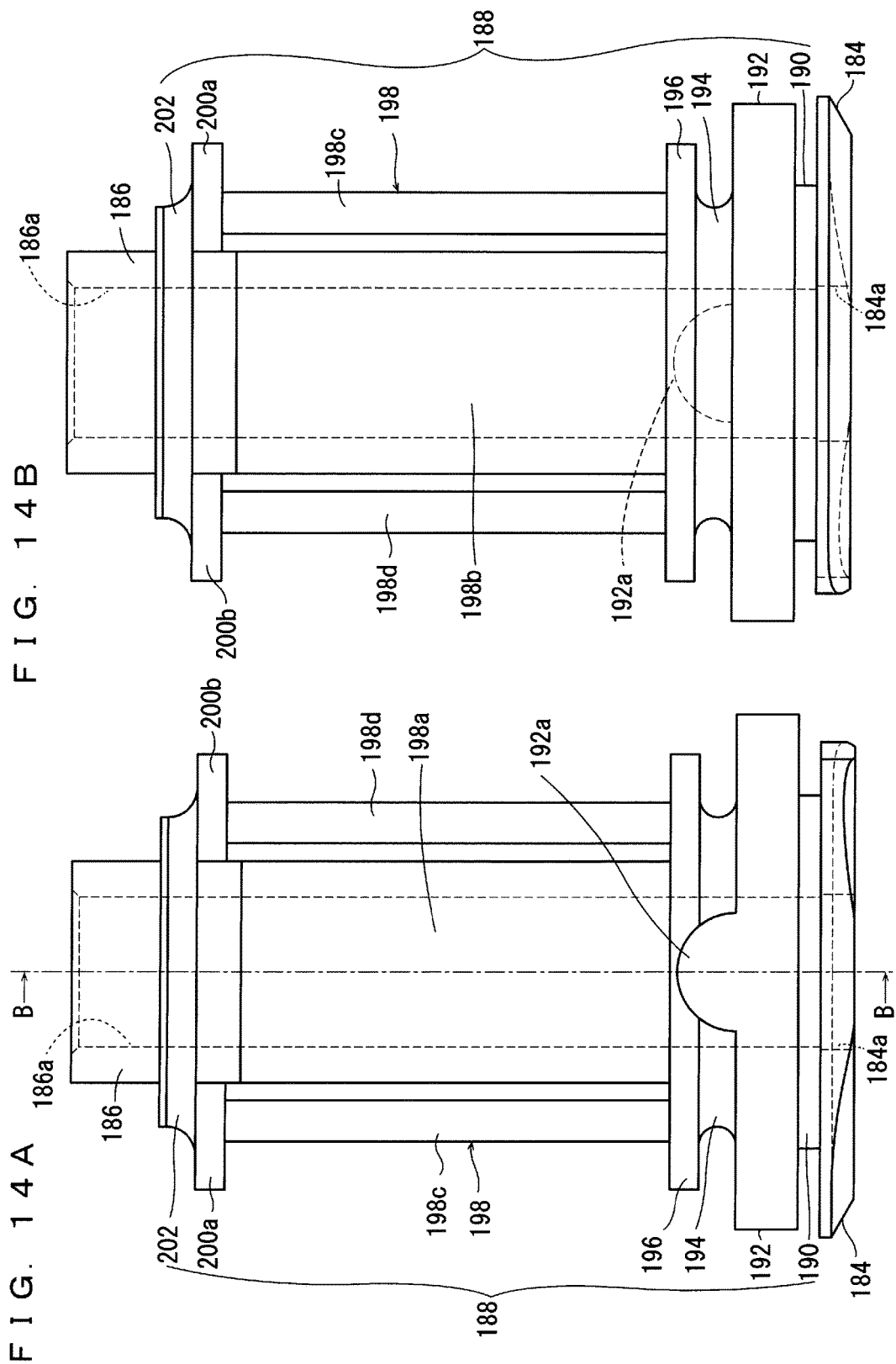

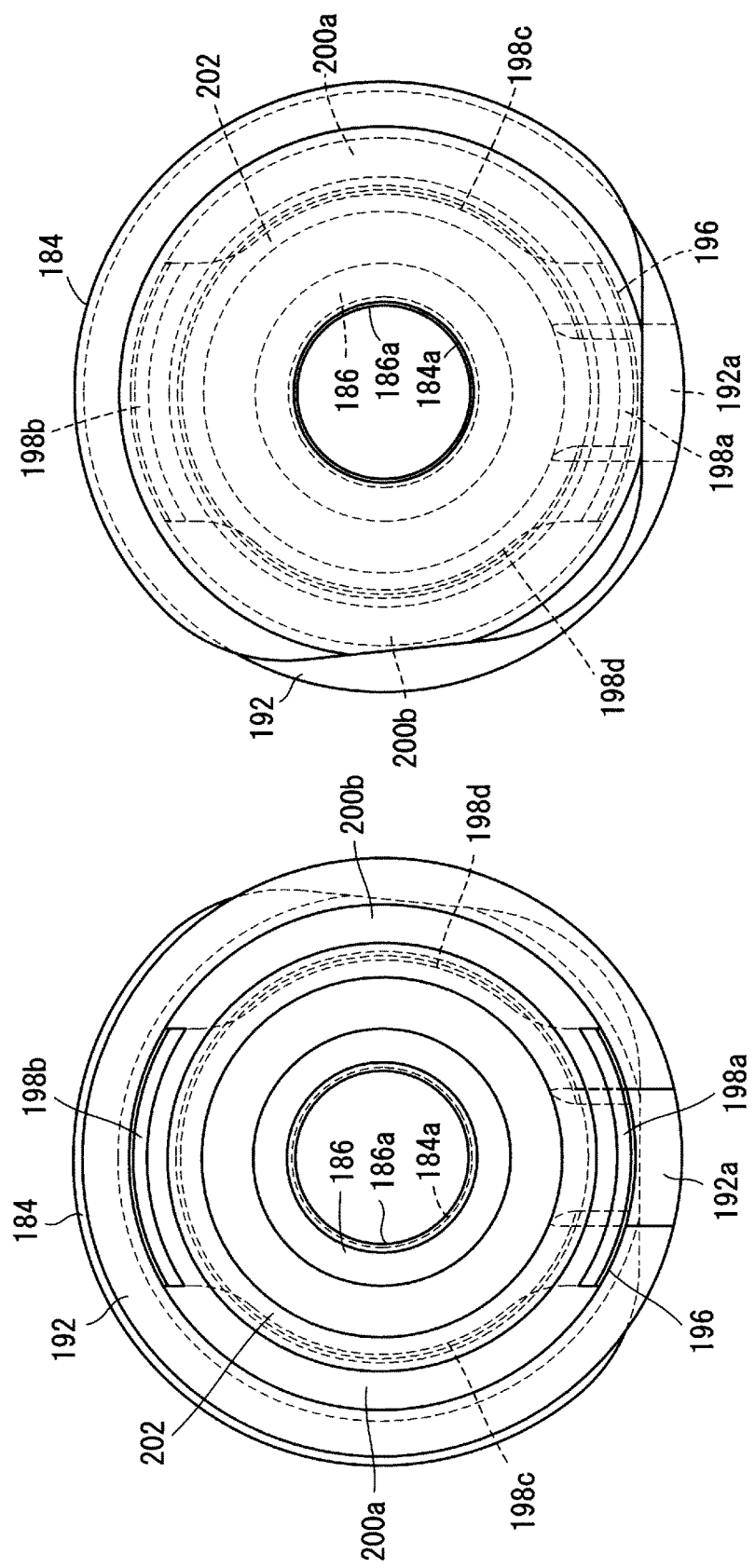

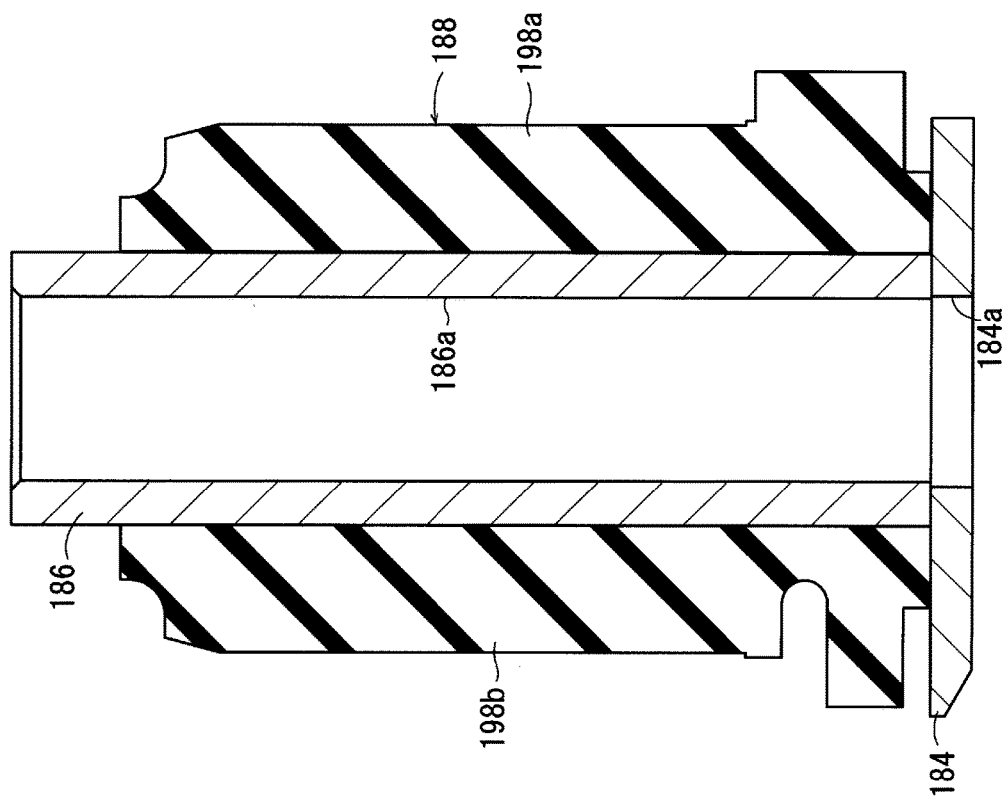
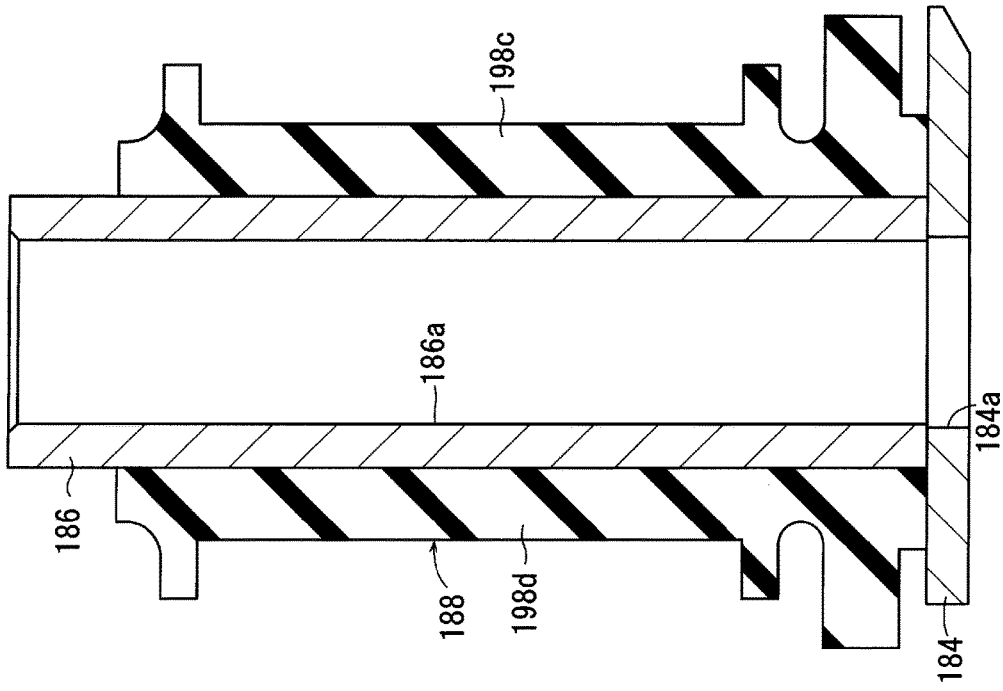

VEHICLE INCLUDING VIBRATION REDUCER

BACKGROUND OF THE INVENTION

1. Field of the Invention

The present invention relates to vehicles, and more specifically to an off-road vehicle, or an ROV (Recreational Off-Highway Vehicle).

2. Description of the Related Art

U.S. Pat. No. 7,819,220 proposes an ROV which has an engine mounted behind seats. According to the ROV disclosed in U.S. Pat. No. 7,819,220, the engine is disposed behind two seats which are arranged side by side to each other. The engine is mounted on a frame at three points but an upper part of the engine is not supported.

In such a structure as this, it is likely that vibration of the engine is transmitted to the frame via mounting supports, causing the engine and the frame to resonate with each other. In this case, due to a short distance between the seats and the engine, the engine vibration is easily transmitted to the driver and the passenger via the frame and the seats, resulting in an uncomfortable ride.

SUMMARY OF THE INVENTION

Preferred embodiments of the present invention provide a vehicle capable of reducing engine vibration.

According to a preferred embodiment of the present invention, a vehicle includes a pair of front wheels; at least a pair of rear wheels; a frame supported by the pair of front wheels and the pair of rear wheels; a seat supported by the frame; an engine including a crank shaft and a cylinder head and disposed behind the seat; a mounting support provided between the engine and the frame, at a lower position that is lower than a center of the engine in an up-down direction; and a vibration reducing member provided between the engine and the frame, at a higher position that is higher than the center of the engine in the up-down direction.

According to a preferred embodiment of the present invention, in a vehicle in which an engine is disposed behind the seat, a lower portion of the engine and the frame are connected to each other via the mounting support, whereas an upper portion of the engine and the frame are connected to each other via the vibration reducing member. Therefore, it is possible to reduce vibration of the engine through the vibration reducing member. Therefore, it is possible to reduce resonance between the engine and the frame, and to provide a comfortable ride.

Preferably, the seat includes a seat bottom including a seat surface; and a seat back portion having a backrest surface. With this arrangement, at least a portion of the engine is at a position more rearward than the seat back portion and higher than a lower end of the seat bottom when the vehicle is viewed from a side, and the vibration reducing member is disposed at a higher position that is higher than the lower end of the seat bottom. In this case, it is possible to effectively utilize a relatively roomy space which is located farther rearward than the seat back portion and higher than the lower end of the seat bottom, allowing easy layout.

Further preferably, the engine is disposed to stride over a center in a width direction of the vehicle. If an engine is mounted to stride over a center in the width direction of the vehicle, i.e., if the engine is disposed generally at a center in the width direction of the vehicle, vibration of the engine tends to be transmitted to the seat which is in front of the engine, via the frame widely in the vehicle's width direction. However, since preferred embodiments of the present invention are capable of reducing vibration of the engine and reduce resonance between the engine and the frame, it is possible according to preferred embodiments of the present invention to reduce vibration transmission of the engine to the seat even if the engine is mounted to stride over a center in the width direction of the vehicle.

Further, preferably, the crank shaft is oriented in a width direction of the vehicle, and the cylinder head is tilted rearward. In the case where the crank shaft is oriented in the vehicle's width direction and the cylinder head is tilted rearward, vibration of the engine tends to be in a direction perpendicular or substantially perpendicular to the crank shaft, i.e., in a fore-aft direction of the vehicle. However, according to preferred embodiments of the present invention, it is possible to reduce engine vibration in such a direction, by using a vibration reducing member.

Preferably, the vibration reducing member is connected to the cylinder head. When the engine vibrates with its lower portion mounted on the frame, vibration (amplitude) of the cylinder head which is in an upper portion of the engine increases. However, by connecting the cylinder head to the frame via the vibration reducing member, it becomes possible to reduce vibration of the cylinder head.

Further preferably, the engine further includes a head cover, and the vibration reducing member is connected to the head cover. When the engine vibrates with its lower portion mounted on the frame, vibration (amplitude) of the head cover which is in an upper portion of the engine increases. However, by connecting the head cover to the frame via the vibration reducing member, it becomes possible to reduce vibration of the head cover.

Further, preferably, the frame includes a cross member extending in a width direction of the vehicle, and the vibration reducing member is connected to the cross member. By connecting the vibration reducing member to the engine and the cross member which extends in the vehicle's width direction, it is possible to effectively reduce vibration of the engine in a fore-aft direction of the vehicle.

Preferably, the vibration reducing member includes a torque rod. In this case, the vibration reducing member is able to be provided easily by using the torque rod.

Further preferably, the torque rod extends in a direction perpendicular or substantially perpendicular to the crank-shaft when the vehicle is viewed in a plan view. In this case, since the torque rod extends in a direction perpendicular or substantially perpendicular to the crank shaft when the vehicle is viewed in a plan view, i.e., in the direction of the vibration, it is possible to effectively reduce vibration with the torque rod.

Further, preferably, the vehicle includes a rubber damper provided at each end of the torque rod. By providing the rubber dampers at both ends of the torque rod, it becomes possible to reduce vibration of the engine more effectively.

Preferably, the rubber damper includes a cylindrical damper having directionality. In this case, it is possible to specifically reduce vibration in a specific direction.

Further preferably, the rubber dampers provided at two respective ends of the torque rod have their axes oriented in different directions from each other. In this case, it is possible to reduce vibration in any direction.

Further, preferably, the vehicle includes a cargo bed, and the engine and the vibration reducing member are below the cargo bed. In this case, it is possible to protect the engine and the vibration reducing member with the cargo bed.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 10A is a front view showing a mounting support; FIG. 10B is a side view thereof.

FIG. 11A is a plan view showing the vibration reducing member, a bracket, etc.; FIG. 11B is a side view thereof.

FIG. 13A is a left side view showing the rubber damper; FIG. 13B is a right side view thereof.

FIG. 14A is a front view showing the rubber damper; FIG. 14B is a rear view thereof.

FIG. 15A is a plan view showing the rubber damper; FIG. 15B is a bottom view thereof.

FIG. 16A is a sectional view taken in lines A-A in FIG. 13A; FIG. 16B is a sectional view taken in lines B-B in FIG. 14A.

DETAILED DESCRIPTION OF THE PREFERRED EMBODIMENTS

Hereinafter, preferred embodiments of the present invention will be described with reference to the drawings. It is noted that the terms front and rear, right and left, up and down as used in the preferred embodiments of the present invention are determined from the driver's position on a seat 18a of a vehicle 10, with the driver facing toward a steering wheel 20.

Figure 1:
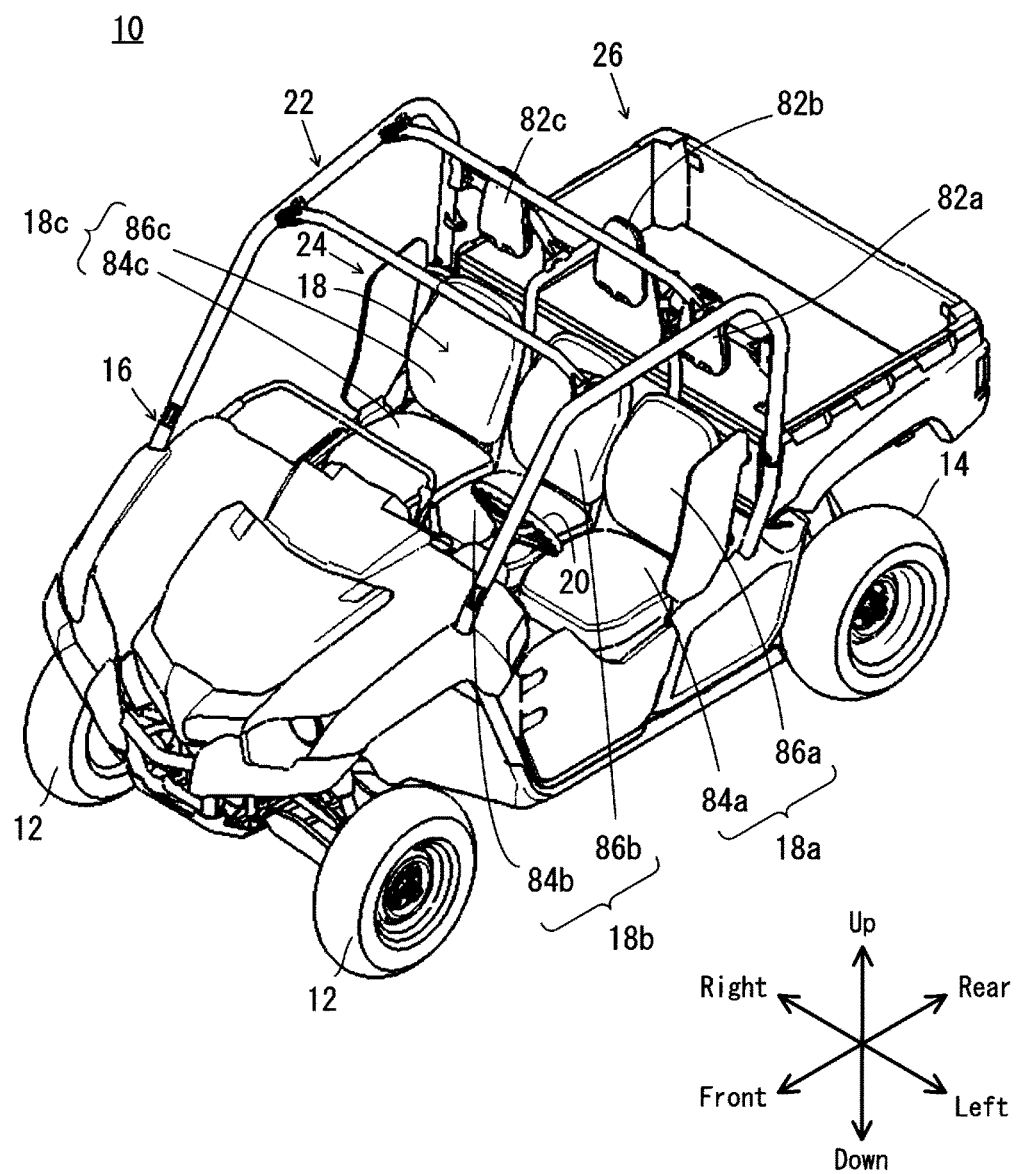
FIG. 1 is a perspective view showing a vehicle according to a preferred embodiment of the present invention.
Figure 2:
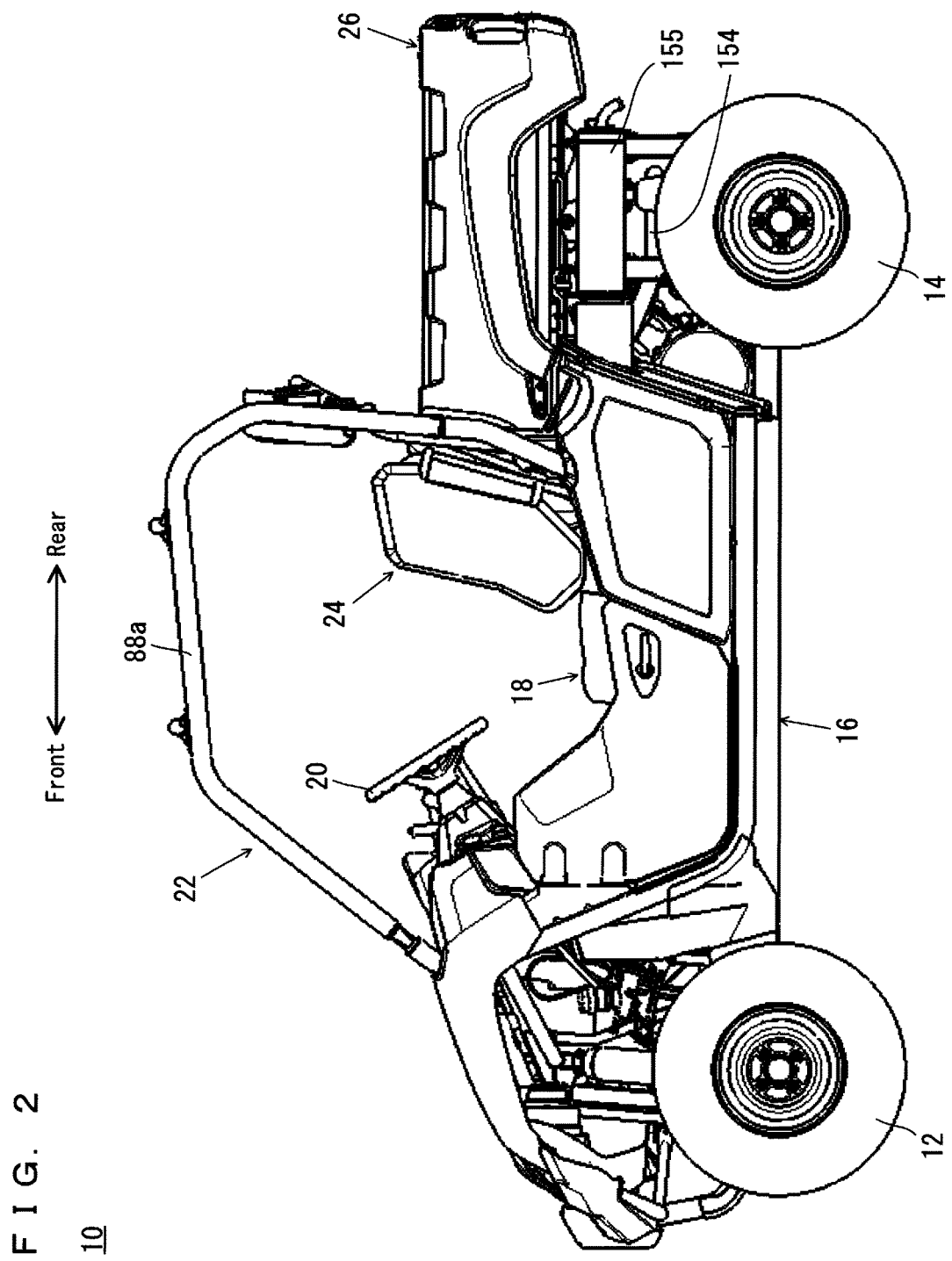
FIG. 2 is a side view showing the vehicle.
Figure 3:
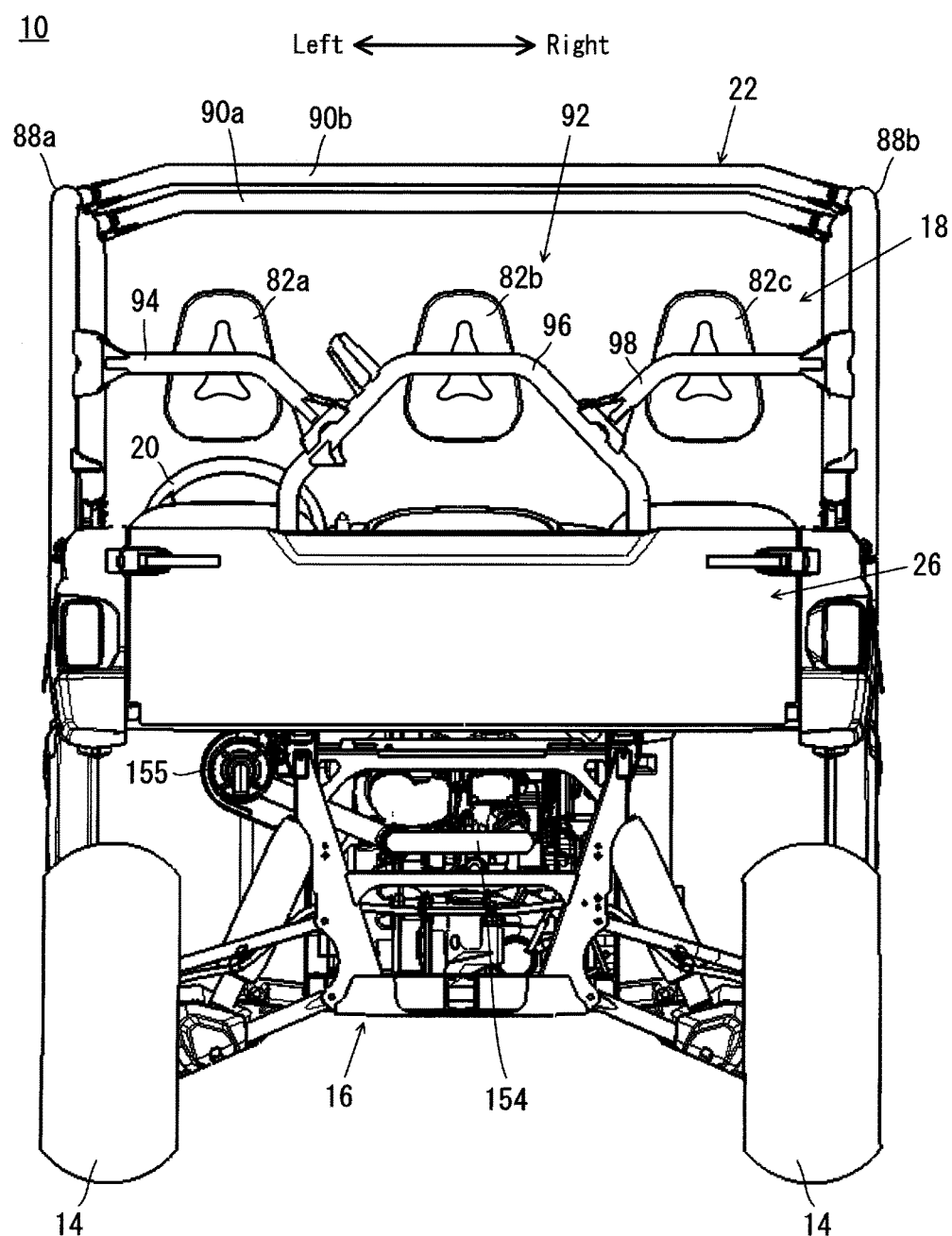
FIG. 3 is a rear view showing the vehicle.
Figure 7:
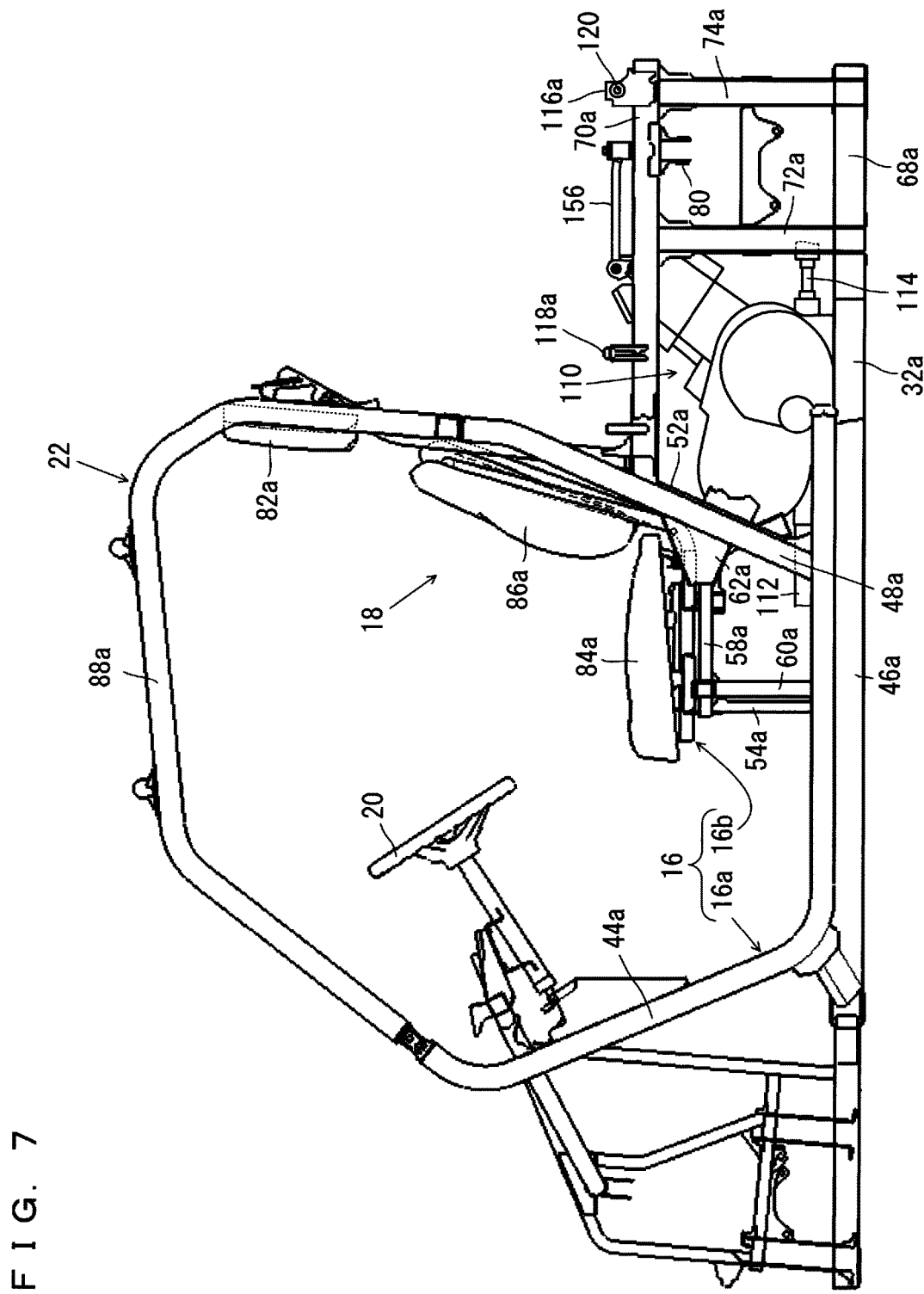
FIG. 7 is a side view showing a frame, a seat, a steering wheel, the roll-over protection cage, an engine and a pair of propeller shafts.

Referring to FIG. 1 through FIG. 3, a vehicle 10 according to a preferred embodiment of the present invention is an off-road vehicle or an ROV, and includes a pair of front wheels 12, a pair of rear wheels 14, a frame 16, a seat 18, a steering wheel 20, a roll-over protection cage 22, shoulder bolster portions 24 and a cargo bed 26. The frame 16 is supported by the pair of front wheels 12 and the pair of rear wheels 14. Referring to FIG. 7, the frame 16 includes a main frame 16a supported by the pair of front wheels 12 (see FIG. 1) and the pair of rear wheels 14 (see FIG. 1); and a seat frame 16b supported by the main frame 16a. The seat 18 is supported by the seat frame 16b.

Figure 4:
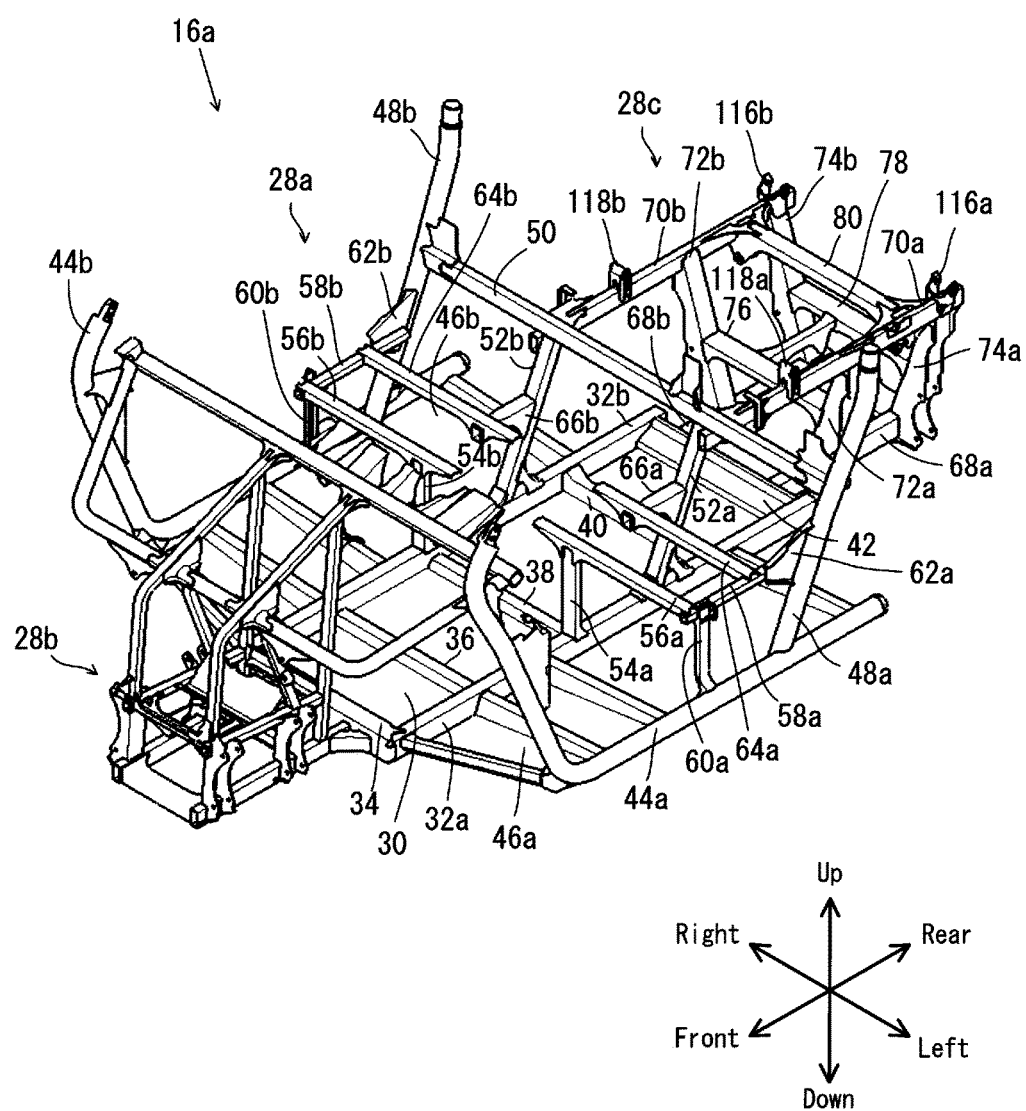
FIG. 4 is a perspective view showing a main frame.

Referring to FIG. 4, the main frame 16a includes a frame intermediate portion 28a, a frame front portion 28b and a frame rear portion 28c. The frame front portion 28b is in front of the frame intermediate portion 28a. The frame rear portion 28c is behind the frame intermediate portion 28a.

The frame intermediate portion 28a includes a rectangular or substantially rectangular platy member 30. On the platy member 30, there is provided a pair of side frames 32a, 32b extending in a fore-aft direction. The side frames 32a, 32b are parallel or substantially parallel to each other. The side frames 32a, 32b are connected to each other by cross members 34, 36, 38, 40 and 42 extending in a left-right direction (width direction of the vehicle 10). The cross members 34, 36, 38, 40 and 42 are parallel or substantially parallel to each other and are disposed in this order from front to rear. The cross member 34 connects the side frames 32a, 32b to each other at their respective front end regions. The cross member 42 connects the side frames 32a, 32b to each other at their respective rear end regions.

In the width direction of the vehicle 10, a pair of L-shaped support frames 44a, 44b are located on outer sides of the respective side frames 32a, 32b. The support frame 44a is connected to the side frame 32a via a plate frame 46a. The support frame 44b is connected to the side frame 32b via a plate frame 46b. A pair of support frames 48a, 48b extend obliquely upward and rearward from rear regions of the support frames 44a, 44b. The support frames 48a, 48b have their respective generally central regions connected to each other by a cross member 50 extending in a left-right direction. The side frame 32a and the cross member 50 are connected to each other by a support frame 52a. The side frame 32b and the cross member 50 are connected to each other by a support frame 52b. The support frames 52a, 52b extend obliquely upward and rearward from the side frames 32a, 32b, at a more forward position than the cross member 42. The support frames 52a, 52b are disposed generally in parallel, or substantially in parallel, to the support frames 48a, 48b.

A pair of support frames 54a, 54b extend upward from generally central regions of the side frames 32a, 32b. A pair of support frames 56a, 56b extend in a left-right direction, being supported by upper ends of the support frames 54a, 54b. The support frame 56a includes an end region (left end region in the present preferred embodiment) connected to a front end region of a support frame 58a which extends in a fore-aft direction. The support frame 56b includes an end region (right end region in the present preferred embodiment) connected to a front end region of a support frame 58b which extends in a fore-aft direction.

The support frame 58a includes a front region connected to the support frame 44a by a support frame 60a which extends in an up-down direction. The support frame 58b includes a front region connected to the support frame 44b by a support frame 60b which extends in an up-down direction. The support frame 58a includes a rear region connected to the support frame 48a via a connecting member 62a. The support frame 58b includes a rear region connected to the support frame 48b via a connecting member 62b.

Behind the support frame 56a, a support frame 64a is parallel or substantially parallel to the support frame 56a. Behind the support frame 56b, a support frame 64b is parallel or substantially parallel to the support frame 56b. The support frame 64a includes an end region (left end portion in the present preferred embodiment) connected to the support frame 58a. The support frame 64b includes an end region (right end portion in the present preferred embodiment) connected to the support frame 58b.

A pair of support frames 66a, 66b extend forward from generally central regions of the support frames 52a, 52b. The support frames 66a, 66b have front end regions connected to the support frames 64a, 64b.

The frame rear portion 28c includes a pair of side frames 68a, 68b extending rearward from the cross member 42. In the width direction of the vehicle 10, the side frames 68a, 68b are positioned on a more inboard side than the side frames 32a, 32b. The side frame 68a and the side frame 68b are parallel or substantially parallel to each other.

At a higher position than the side frames 68a, 68b, a pair of side frames 70a, 70b extend in a fore-aft direction. The side frames 70a, 70b are parallel or substantially parallel to each other. In the width direction of the vehicle 10, the side frames 70a, 70b are on a more outboard side than the side frames 68a, 68b. The side frames 70a, 70b include front end regions connected to upper end regions of the support frames 52a, 52b respectively.

The side frames 68a, 68b and the side frames 70a, 70b are connected to each other by a pair of support frames 72a, 72b which extend in an up-down direction, and by a pair of support frames 74a, 74b which extend in an up-down direction. The support frames 72a, 72b are at a more forward position than the support frames 74a, 74b. The support frame 72a and the support frame 72b are connected to each other by a cross member 76 extending in a left-right direction. The support frame 74a and the support frame 74b are connected to each other by a cross member 78 extending in a left-right direction. The side frame 70a and the side frame 70b are connected to each other by a cross member 80 extending in a left-right direction. The cross member 80 is at a position more rearward than the support frames 72a, 72b but more forward than the support frames 74a, 74b.

Referring to FIG. 4 and FIG. 7, the seat 18 is supported by the support frames 56a, 56b, 64a, 64b of the main frame 16a via the seat frame 16b. The seat 18 includes seats 18a, 18b and 18c; and headrest portions 82a, 82b and 82c (see FIG. 1 and FIG. 3). The seats 18a, 18b and 18c respectively include seat bottoms 84a, 84b and 84c each including a seat surface; and seat back portions 86a, 86b, 86c each including a backrest surface. Referring to FIG. 1, the steering wheel 20 is in front of the seat 18a of the seat 18. The seat 18 and the steering wheel 20 are enclosed by the roll-over protection cage 22. The roll-over protection cage 22 is supported by the frame 16.

Figure 5:
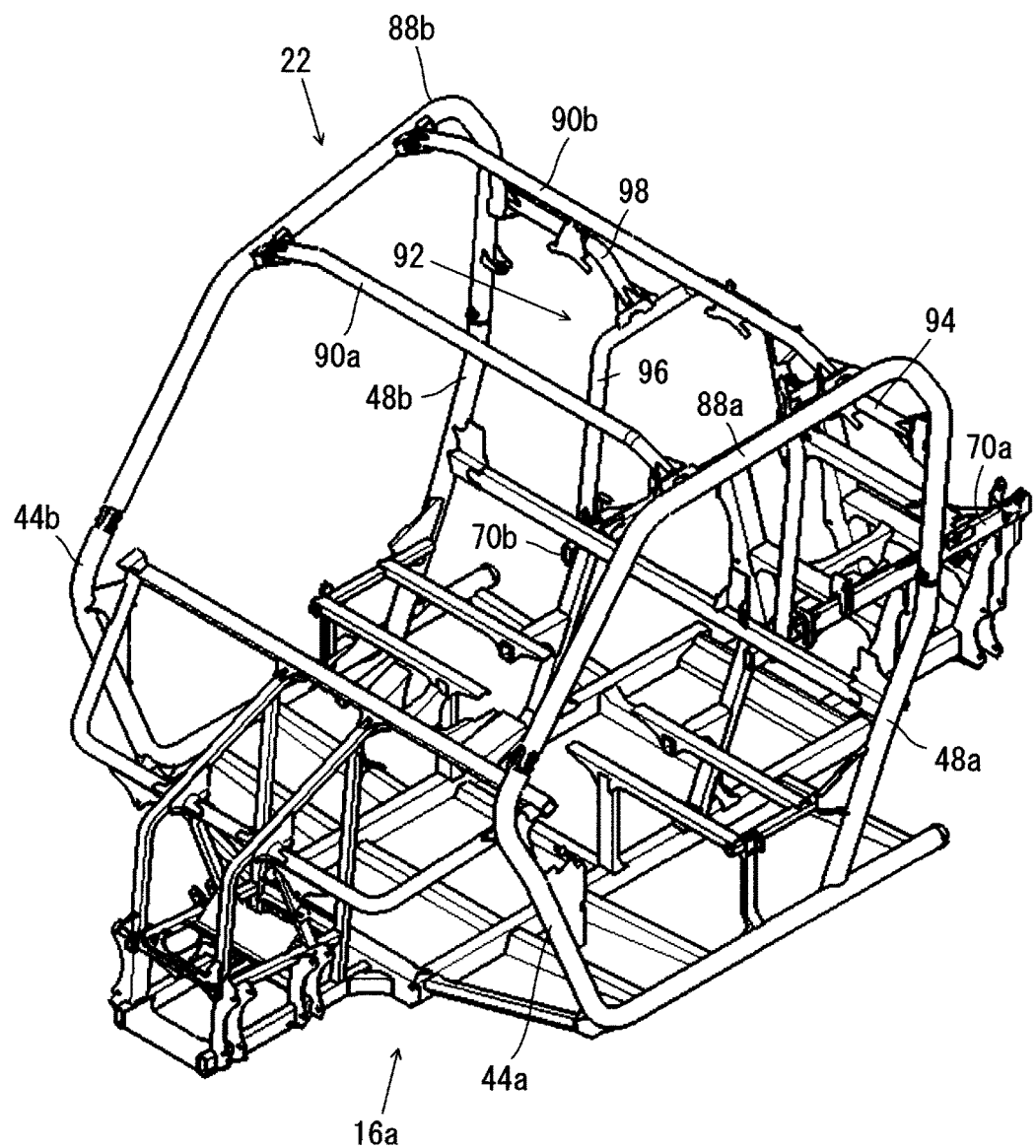
FIG. 5 is a perspective view showing the main frame and a roll-over protection cage.

Referring to FIG. 5, the roll-over protection cage 22 includes a pair of side cage members 88a, 88b extending in a fore-aft direction; a pair of roof members 90a, 90b extending in a left-right direction; and a cross member portion 92 extending in a left-right direction.

The side cage members 88a, 88b preferably have an inverted U shape when viewed from a side, or substantially an inverted U shape when viewed from a side, and are supported by the frame 16. Specifically, the side cage member 88a includes a first end region (front end region in the present preferred embodiment) which is connected to an upper end region of the support frame 44a, and the side cage member 88a includes a second end region (rear end region in the present preferred embodiment) which is connected to an upper end region of the support frame 48a. Likewise, the side cage member 88b includes a first end region (front end region in the present preferred embodiment) which is connected to an upper end region of the support frame 44b, and the side cage member 88b includes a second end region (rear end region in the present preferred embodiment) which is connected to an upper end region of the support frame 48b.

The roof members 90a, 90b connect an upper portion of the side cage member 88a and an upper portion of the side cage member 88b. The roof member 90b is located at a more rearward position than the roof member 90a. The roof member 90b is located at a higher position than the seat 18.

Referring to FIG. 1, FIG. 3 and FIG. 5, the cross member portion 92 includes support members 94, 96 and 98. The support member 96 is at a center region in the width direction of the vehicle 10. The support member 94 connects the support member 96 and the side cage member 88a. The support member 98 connects the support member 96 and the side cage member 88b. The headrest portions 82a, 82b and 82c of the seat 18 are attached to the support members 94, 96 and 98, respectively. The support member 96 preferably has an inverted U shape when viewed from front, or substantially an inverted U shape when viewed from front. The support member 96 includes two end regions connected to the side frames 70a, 70b in a disconnectable/reconnectable fashion.

The cross member portion 92 which has the arrangement described above is attached to the side frames 70a, 70b of the frame 16 and the side cage members 88a, 88b of the roll-over protection cage 22 in a detachable/reattachable fashion.

Figure 6:
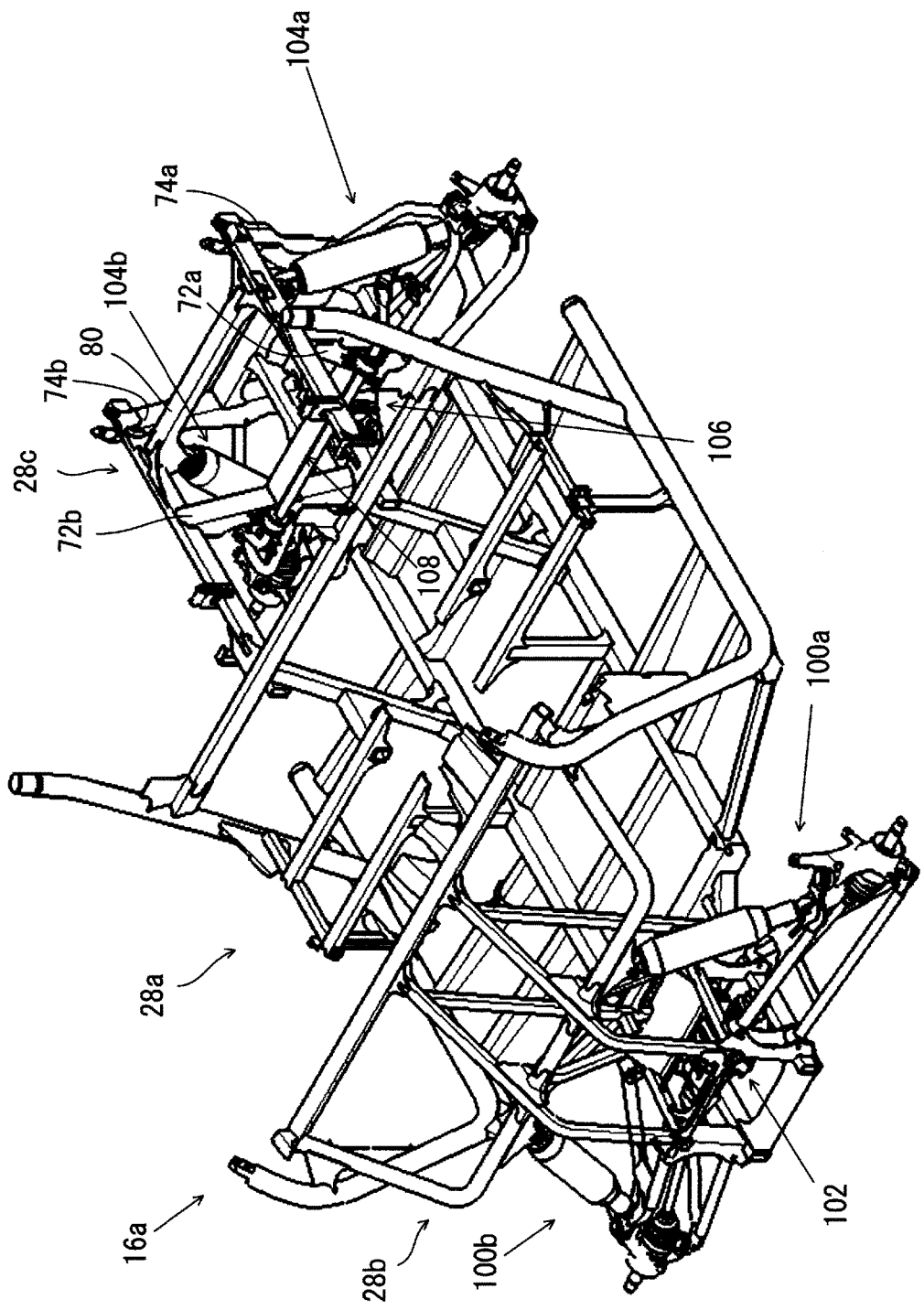
FIG. 6 is a perspective view showing the main frame, a pair of suspension assemblies for front wheels, a rotation transmission for the front wheels, a pair of suspension assemblies for rear wheels, and a rotation transmission for the rear wheels.

Referring to FIG. 6, the vehicle 10 further includes a pair of suspension assemblies 100a, 100b which suspend the pair of front wheels 12 (see FIG. 1); a rotation transmission 102 which transmits rotation from an engine 110 (see FIG. 7) to be described later to the pair of front wheels 12; a pair of suspension assemblies 104a, 104b which suspend the pair of rear wheels 14 (see FIG. 1); a rotation transmission 106 which transmits rotation from the engine 110 to the pair of rear wheels 14; and a rear stabilizer 108 which connects the suspension assemblies 104a, 104b. The frame 16 (see FIG. 1) is supported by the pair of front wheels 12 and the pair of rear wheels 14 via the suspension assemblies 100a, 100b, 104a, 104b. In the present preferred embodiment, the suspension assemblies 100a, 100b, 104a, 104b are of a double wishbone type, for example. The rotation transmission 102 is connected to the engine 110 via a propeller shaft 112 (see FIG. 7) to be described later. The rotation transmission 106 is connected to the engine 110 via a propeller shaft 114 (see FIG. 7) to be described later.

Referring to FIG. 7, at a generally central region in the width direction of the vehicle 10, the propeller shaft 112 extends forward from a lower end portion of the engine 110, and the propeller shaft 114 extends rearward from a lower end portion of the engine 110. Rotation from the engine 110 is transmitted to the pair of front wheels 12 via the propeller shaft 112 and the rotation transmission 102. This causes the pair of front wheels 12 to rotate. Rotation from the engine 110 is transmitted to the pair of rear wheels 14 via the propeller shaft 114 and the rotation transmission 106. This causes the pair of rear wheels 14 to rotate.

The vehicle 10 further includes a transfer mechanism (not illustrated) which transmits movement of the steering wheel 20 to the pair of front wheels 12. The transfer mechanism can be any of known components such as rack and pinion type transfer mechanisms, so description thereof will not be provided here.

Referring also to FIG. 2, and FIG. 7 through FIG. 9, the pair of side frames 70a, 70b extend in a fore-aft direction below the cargo bed 26, and include a pair of first supports 116a, 116b which support a rear portion of the cargo bed 26 pivotably; and a pair of second supports 118a, 118b which are located at a more forward position than the pair of the first supports 116a, 116b and support front portions of the cargo bed 26. The cargo bed 26 is connected to the first supports 116a, 116b of the side frames 70a, 70b via a connecting member 120. Thus, the cargo bed 26 is pivotable around the connecting portion, in an up-down direction. In other words, the cargo bed 26 is pivotably supported by the frame 16 behind the roll-over protection cage 22.

Figure 8:
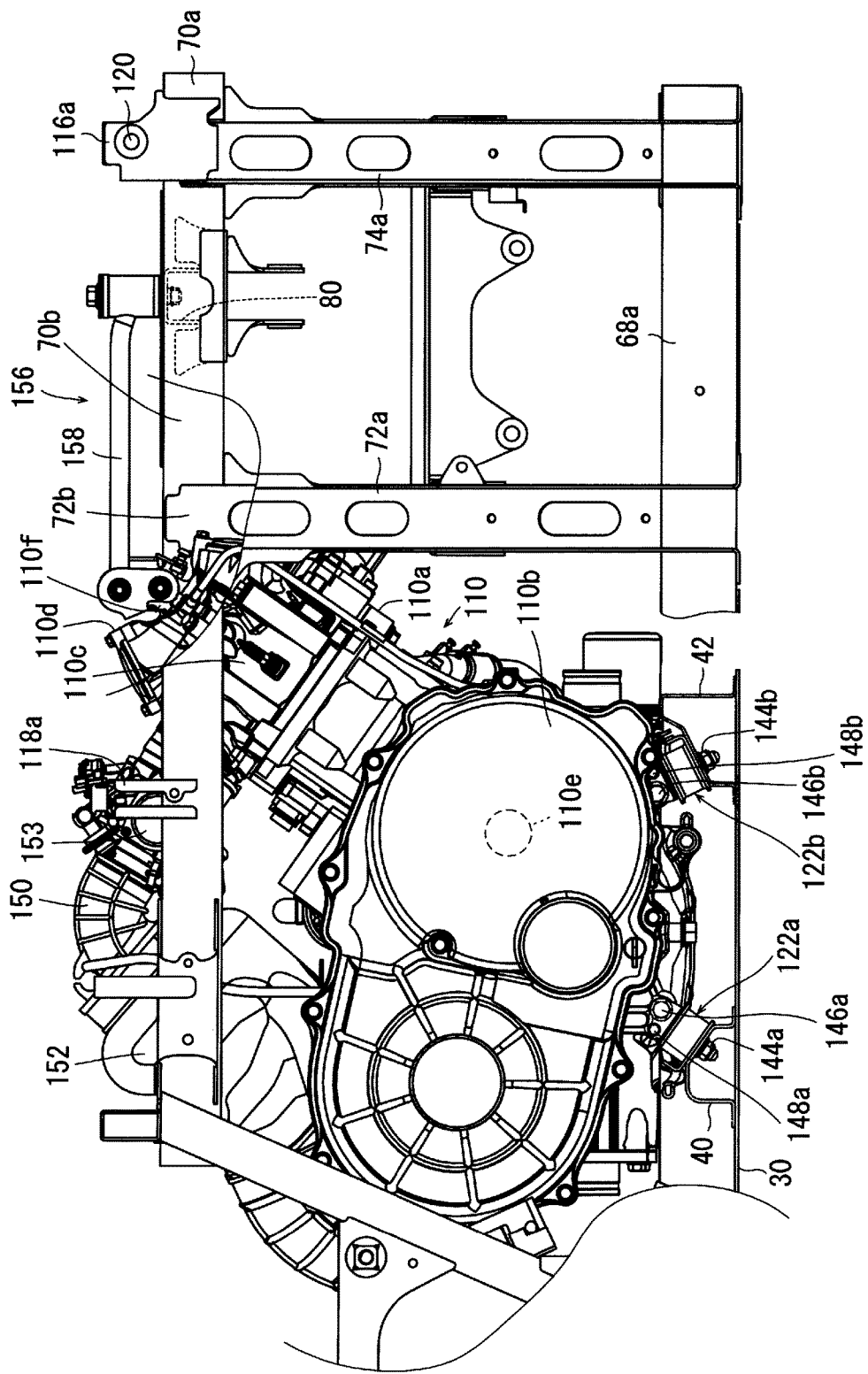
FIG. 8 is an illustrative side view showing a rear region of the frame, the engine, a vibration reducing member and surrounding elements.
Figure 9:
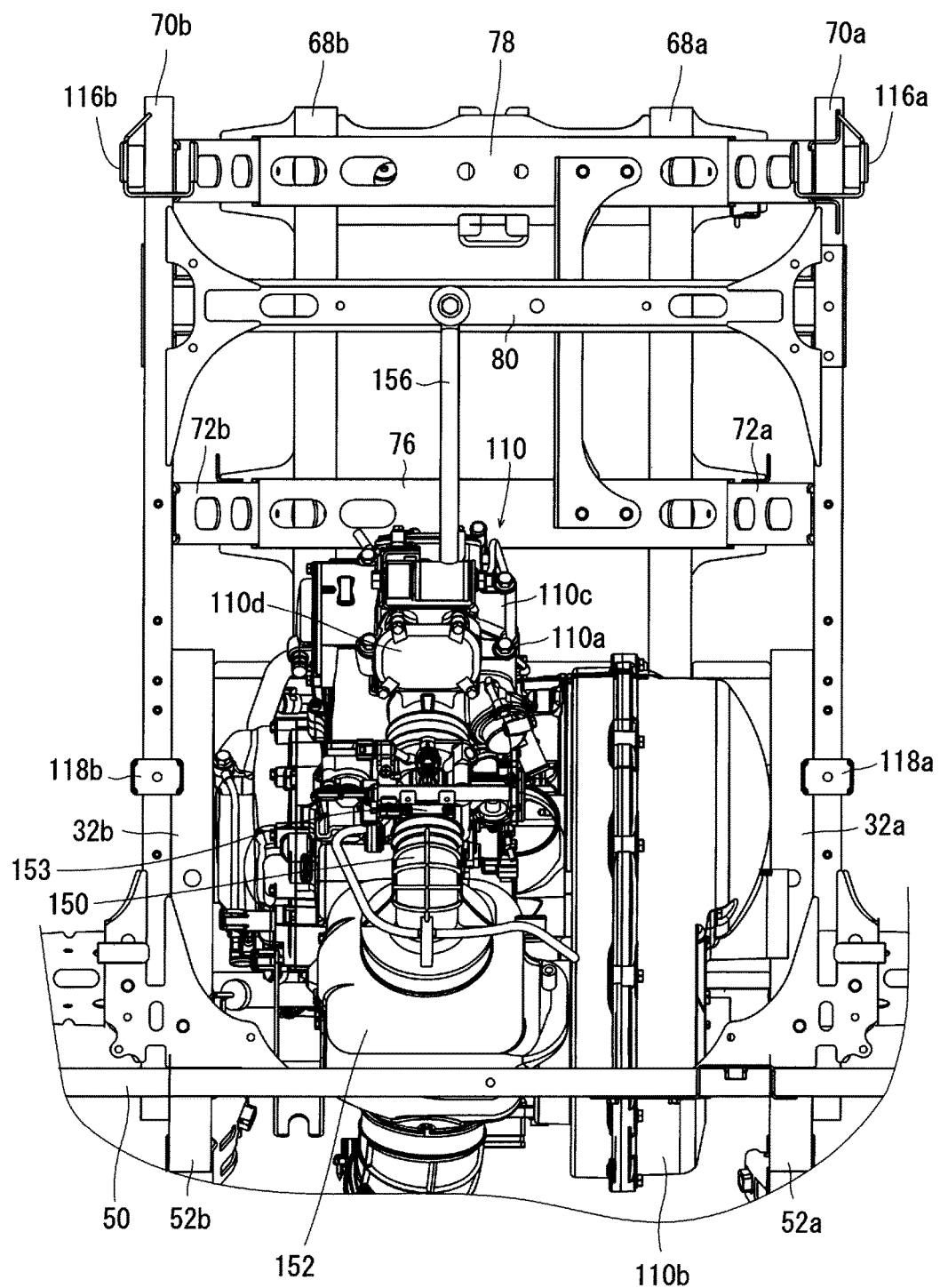
FIG. 9 is a plan view showing the rear region of the frame, the engine, the vibration reducing member and surrounding elements.
Figure 12:
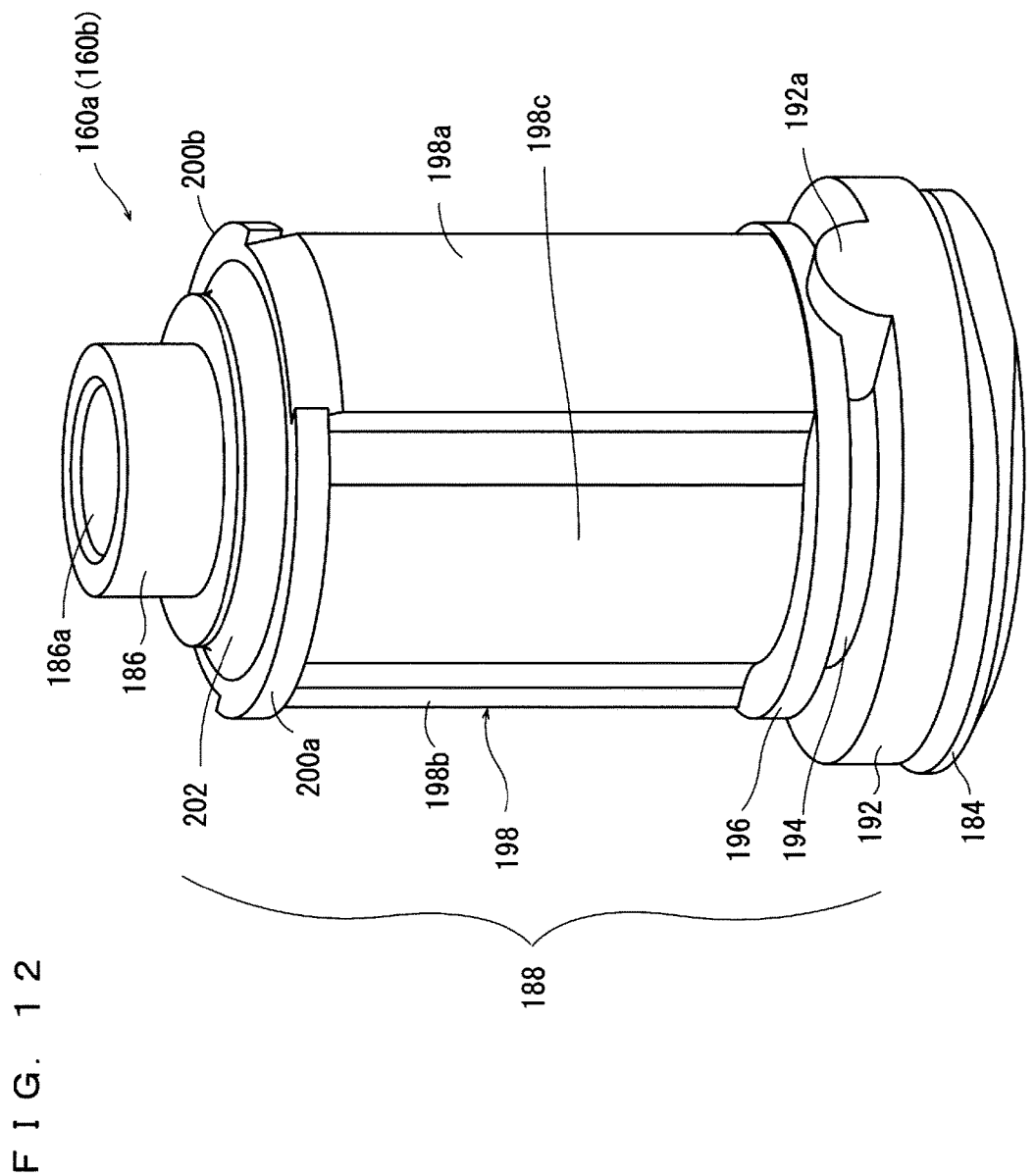
FIG. 12 is a perspective view showing a rubber damper.

Referring to FIG. 7 through FIG. 9, the engine 110 is disposed behind the seat 18, to stride over the center in the width direction of the vehicle 10. Most of the engine 110 is located within a region surrounded by the side frames 32a, 32b, the side frames 68a, 68b, the support frames 52a, 52b, the side frames 70a, 70b, and the support frames 72a, 72b. The engine 110 is tilted slightly rearward below the cargo bed 26. In the present preferred embodiment, at least a portion of the engine 110 is at a more rearward position than the roll-over protection cage 22. When the vehicle is viewed from a side, at least a portion of the engine 110 is at a more rearward position than the seat back portions 86a, 86b, 86c, at a higher position than lower ends of the seat bottoms 84a, 84b, 84c. The engine 110 includes a cylinder portion 110a and a transmission case 110b which is integral with the cylinder portion 110a. The cylinder portion 110a includes a cylinder head 110c and a head cover 110d on its upper portion. The transmission case 110b incorporates a crank shaft 110e. The crank shaft 110e is oriented in the width direction of the vehicle 10. The cylinder head 110c is tilted rearward. The engine 110 is connected to the cross members 40, 42 at a rear region of the main frame 16a via mounting supports 122a, 122b.

Referring to FIG. 10A and FIG. 10B, the mounting support 122a includes plates 124, 126; elastic members 128, 130; a bracket 132; and a bolt 134. Each of the plates 124, 126 is made of metal, for example, and defines a rectangular or substantially rectangular plate having a generally L-shaped section. The plates 124, 126 are opposed to each other. The elastic members 128, 130 are made of a highly durable rubber, for example. The elastic member 128 is generally prismatic and sandwiched by the plates 124 and 126. The elastic member 130 preferably is generally strip-shaped, and is at an end region of the plate 124. In other words, the elastic member 128 is between two respective first main surfaces of the plates 124 and 126, whereas the elastic member 130 is at an end region of a second main surface of the plate 124. The bracket 132 is at a center region of a second main surface of the plate 126. The bracket 132 includes plates 136, 138. The plates 136, 138 are preferably made of metal, for example, have a generally L-shaped section, and are disposed back to back relative to each other on the second main surface of the plate 126. The bracket 132 includes two through-holes 140, 142. The bolt 134 is at a center region of the second main surface of the plate 124. The mounting support 122b is arranged in the same manner as is the mounting support 122a, so description thereof is not repeated.

Referring to FIG. 8, the mounting supports 122a, 122b define and function as rubber dampers, and are provided between the engine 110 and the frame 16 (cross members 40, 42), at a position lower than a center of the engine 110 in an up-down direction. Specifically, as for the mounting support 122a, the bolt 134 which is inserted through the cross member 40 is fixed with a nut 144a while a lower region of the cylinder portion 110a of the engine 110 and the bracket 132 are fixed with fasteners (including bolts and nuts, for example) 146a, 148a which are inserted through the through-holes 140, 142, under a state that the mounting support 122a is slightly tilted rearward. As for the mounting support 122b, at a more rearward position than the mounting support 122a, the bolt 134 which is inserted through the cross member 42 is fixed with a nut 144b while a lower region of the cylinder portion 110a of the engine 110 and the bracket 132 are fixed with fasteners (including bolts and nuts, for example) 146b, 148b which are inserted through the through-holes 140, 142, in a state in which the mounting support 122b is slightly tilted forward.

Referring to FIG. 8 and FIG. 9, the cylinder head 110c of the engine 110 is connected to an air cleaner 152 via an air intake pipe 150. The air cleaner 152 is located at a forward position of the engine 110. The air intake pipe 150 is provided with a throttle body 153. The cylinder head 110c is connected to a muffler 155 (see FIG. 2 and FIG. 3) via an exhaust pipe 154. For example, the muffler 155 is disposed at a position obliquely leftward and rearward of the engine 110, on a left side of the side frame 70a, and supported by the side frame 70a via an unillustrated support member. Also, the side frames 70a, 70b are connected to each other by a protective member (not illustrated) extending in the width direction of the vehicle 10. For example, the protective member is fixed to upper surfaces of side frames 70a, 70b, covering above the throttle body 153.

The cylinder head 110c of the engine 110 and the cross member 80 which extends in a left-right direction (vehicle's width direction) are connected to each other via a vibration reducing member 156. The vibration reducing member 156 is located at a position higher than the center of the engine 110 in an up-down direction between the engine 110 and the frame 16 and higher than the lower ends of the seat bottoms 84a, 84b, 84c (see FIG. 1 and FIG. 7). Also, the vibration reducing member 156 is located below the cargo bed 26.

Referring to FIG. 11A and FIG. 11B, the vibration reducing member 156 includes a torque rod 158 and rubber dampers 160a, 160b disposed at two respective ends of the torque rod 158.

The torque rod 158 includes a hollow, rod-shaped rod main body 162; hollow cylindrical damper covers 164a, 164b at ends of the rod main body 162; and lids 166a, 166b disposed at respective openings of the damper covers 164a, 164b. The damper covers 164a, 164b have their axes generally perpendicular to an axis of the rod main body 162. Also, when viewed axially of the rod main body 162, the axes of the damper covers 164a, 164b are generally perpendicular to each other. The rod main body 162, the damper covers 164a, 164b, and the lids 166a, 166b are made of metal, for example. The damper covers 164a, 164b have half-circle cut-outs 168a, 168b on their respective sides for positioning the rubber dampers 160a, 160b. The cut-out 168a is fitted by a protrusion 192a (to be described later) of the rubber damper 160a, such that the damper cover 164a and the rubber damper 160a are positioned. Likewise, the cut-out 168b is fitted by the protrusion 192a of the rubber damper 160b, such that the damper cover 164b and the rubber damper 160b are positioned.

The damper cover 164a, into which the rubber damper 160a is inserted, is closed with the lid 166a, and connected to the engine 110 with a spacer 170 via a bracket 172. Specifically, the bracket 172 includes side portions 174a, 174b; a connecting portion 174c connecting the side portions 174a, 174b; two through-holes 176 (FIG. 11A shows only an upper through-hole 176) at an upper and a lower position in the side portion 174a; and two through-holes 178 (FIG. 11A shows only an upper through-hole 178) at an upper and a lower position in the side portion 174b. The damper cover 164a which is closed by the lid 166a with the rubber damper 160a inserted therein, and the spacer 170 is disposed inside the bracket 172. The damper cover 164a, the rubber damper 160a, the lid 166a, the spacer 170 and the bracket 172 are connected by a bolt 180a inserted through the upper through-holes 176, 178, and threaded into a nut 182a. A bracket portion 110f of the cylinder head 110c and the bracket 172 are connected by a bolt 180b inserted through the lower through-holes 176, 178 and threaded into a nut 182b. Thus, a first end region of the vibration reducing member 156 is connected to the engine 110.

On the other hand, the damper cover 164b, which is closed by the lid 166b with the rubber damper 160b inserted therein, is erected on the cross member 80, and is connected to the cross member 80 with a bolt 180c and a nut 182c. Thus, a second end region of the vibration reducing member 156 is connected to the cross member 80 of the frame 16.

In a state in which the two end portions of the vibration reducing member 156 are connected to the engine 110 and the cross member 80, the torque rod 158 extends in a direction perpendicular or substantially perpendicular to the crank shaft 110e which is oriented in the vehicle's width direction, in a plan view of the vehicle. Also, in a state in which the rubber dampers 160a, 160b are inserted into the damper covers 164a, 164b respectively, the rubber dampers 160a, 160b have their respective axes generally perpendicular to an axis of the rod main body 162; the axes of the rubber dampers 160a, 160b extend in different directions from each other, and in the present preferred embodiment generally perpendicular to each other. In the present preferred embodiment, in a state in which the two end portions of the vibration reducing member 156 are connected to the engine 110 and the cross member 80, the axis of the rubber damper 160a extends in the vehicle's width direction, and the axis of the rubber damper 160b extends in an up-down direction of the vehicle. Also, under this state, the rubber damper 160a is in the following condition: a pair of thin-wall portions 198c, 198d (to be described later) are positioned in a fore-aft direction of the vehicle, and a pair of thick-wall portions 198a, 198b (to be described later) are positioned in the vehicle's up-down direction. On the other hand, the rubber damper 160b is in the following condition: a pair of thin-wall portions 198c, 198d are positioned in the vehicle's fore-aft direction, and a pair of thick-wall portions 198a, 198b are positioned in the vehicle's width direction.

Referring to FIG. 12 through FIG. 16B, the rubber dampers 160a, 160b will be described.

The rubber dampers 160a, 160b are cylindrical and have a directionality.

The rubber damper 160a includes a plate portion 184, an inner cylindrical portion 186 and an outer cylindrical portion 188. The plate portion 184 is made of metal, for example, hollow and generally disc-shaped, having a through-hole 184a at its center region. The inner cylindrical portion 186 is made of metal, for example, hollow and cylindrical, having a through-hole 186a at its center region. The inner cylindrical portion 186 is coaxial with the plate portion 184 on a main surface of the plate portion 184. The outer cylindrical portion 188 is made of an elastic member such as nitrile rubber, for example, is on the main surface of the plate portion 184, and coaxial with the inner cylindrical portion 186 on an outer circumference of the inner cylindrical portion 186. The outer cylindrical portion 188 has a shorter height than the inner cylindrical portion 186. When the outer cylindrical portion 188 is fitted to the inner cylindrical portion 186, the inner cylindrical portion 186 has its tip portion exposed. The plate portion 184, the inner cylindrical portion 186 and the outer cylindrical portion 188 are fixed to each other.

The outer cylindrical portion 188 includes, in the order from a side closer to the plate portion 184, a base portion 190, a support portion 192, a constricted portion 194, an annular portion 196, a cylindrical portion 198, flange portions 200a, 200b and a tapered portion 202.

The base portion 190 has a smaller diameter than the plate portion 184 and the support portion 192, and is in contact with the plate portion 184. The support portion 192 is disc-shaped, and supports the damper cover 164a. The support portion 192 includes an upper surface, at one location thereon, there is provided a protrusion 192a which has a generally half-circle section to position of the rubber damper 160a and the damper cover 164a. The constricted portion 194 includes an inwardly curved side surface, and has a smaller diameter than the support portion 192 and the annular portion 196. The annular portion 196 has an outer diameter which is slightly smaller than an inner diameter of the damper cover 164a. The plate portion 184, the base portion 190, the support portion 192 and the protrusion 192a are exposed to the outside when the rubber damper 160a is inserted into the damper cover 164a.

The cylindrical portion 198 includes a pair of thick-wall portions 198a, 198b and a pair of thin-wall portions 198c, 198d. The pair of thick-wall portions 198a, 198b oppose to each other. The pair of thin-wall portions 198c, 198d oppose to each other. The thick-wall portion 198a is at a location corresponding to the protrusion 192a. The thick-wall portion 198a, the thin-wall portion 198c, the thick-wall portion 198b and the thin-wall portion 198d are positioned in this order in a circumferential direction of the cylindrical portion 198. The thick-wall portions 198a, 198b and the thin-wall portions 198c, 198d have generally the same inner diameter. The thick-wall portions 198a, 198b have greater outer diameters than the thin-wall portions 198c, 198d. In other words, the thick-wall portions 198a, 198b have a greater thickness than the thin-wall portions 198c, 198d. By varying the thickness of the cylindrical portion 198 in its circumferential direction, the rubber damper 160a is given a directionality. In the present preferred embodiment, in directions perpendicular or substantially perpendicular to the axis of the cylindrical portion 198, the rubber damper 160a is more apt to bend, in a direction connecting the pair of thin-wall portions 198c, 198d than in a direction connecting the pair of thick-wall portions 198a, 198b.

The flange portions 200a, 200b are at respective end regions of the thin-wall portions 198c, 198d on a side away from a side facing the annular portion 196 (i.e., on a side closer to the tip portion of the inner cylindrical portion 186). Each of the flange portions 200a, 200b is arc-shaped. The flange portions 200a, 200b have generally the same outer diameter as that of the annular portion 196. The tapered portion 202 includes a curved side surface, tapering smaller in its diameter from a side closer to the cylindrical portion 198 to a side closer to the tip portion of the inner cylindrical portion 186. The rubber damper 160b is formed in the same way as the rubber damper 160a, so description is not repeated.

According to the vehicle 10 as described, in a vehicle including the engine 110 disposed behind the seat 18, a lower portion of the engine 110 and the frame 16 are connected to each other via the mounting supports 122a, 122b, whereas an upper portion of the engine 110 and the frame 16 are connected to each other via the vibration reducing member 156. Therefore, it is possible to reduce vibration of the engine 110 via the vibration reducing member 156 and to reduce resonance between the engine 110 and the frame 16. In particular, it is possible to reduce engine idling vibration in cases where a single-cylinder engine such as the engine 110 is used, i.e., it is possible to reduce car body vibration of the seat 18, the steering wheel 20, etc. during the idling (when the engine is at low rpm). This provides a comfortable ride.

When the vehicle is viewed from a side, at least a portion of the engine 110 is at a position more rearward than the seat back portions 86a, 86b, 86c, higher than lower ends of the seat bottoms 84a, 84b, 84c. The vibration reducing member 156 is at position higher than lower ends of the seat bottoms 84a, 84b, 84c. In other words, it is possible to effectively utilize a relatively roomy space which is located farther rearward than the seat back portions 86a, 86b, 86c and higher than the lower ends of the seat bottoms 84a, 84b, 84c, allowing easy layout.

Since the vehicle 10 is capable of reducing vibration of the engine 110 and reducing resonance between the engine 110 and the frame 16, it is possible to reduce vibration transmission of the engine 110 to the seat 18 even if the engine 110 is disposed to stride over the widthwise center of the vehicle.

According to the vehicle 10, it is possible to reduce vibration of the engine 110 in the vehicle's fore-aft direction, which is a direction perpendicular or substantially perpendicular to the crank shaft 110e, via the vibration reducing member 156.

By connecting the cylinder head 110c and the frame 16 via the vibration reducing member 156, it is possible to reduce vibration of the cylinder head 110c.

By connecting the vibration reducing member 156 to the engine 110 and the cross member 80 which extends in the vehicle's width direction, it is possible to effectively reduce vibration of the engine 110 in the vehicle's fore-aft direction.

The vibration reducing member 156 is easily provided by using the torque rod 158.

Since the torque rod 158 extends in a direction perpendicular or substantially perpendicular to the crank shaft 110e in a plan view of the vehicle, i.e., in the direction of the vibration, it is possible to effectively reduce vibration with the torque rod 158.

By providing the rubber dampers 160a, 160b at two ends of the torque rod 158 respectively, vibration of the engine 110 is reduced more effectively.

Since the rubber dampers 160a, 160b are cylindrical dampers having a directionality, it is possible to specifically reduce vibrations in specific directions.

The axes of the rubber dampers 160a, 160b extend in different directions from each other. This makes it possible to reduce vibration in any direction.

It is preferable that the rubber dampers 160a, 160b include a highly durable material similar to the elastic member 128 included in the mounting supports 122a, 122b of the engine 110, and that axial directions of the rubber dampers 160a, 160b are adjustable so that their spring coefficients are able to be tuned.

The engine 110 and the vibration reducing member 156 are below the cargo bed 26. Therefore, it is possible to protect the engine 110 and the vibration reducing member 156 with the cargo bed 26.

The vibration reducing member 156 may be connected to the head cover 110d. By connecting the head cover 110d and the frame 16 via the vibration reducing member 156, it is possible to reduce vibration of the head cover 110d.

A heat insulation panel (not illustrated) may be provided between the rubber damper 160b which is disposed at an end portion of the torque rod 158 and the cross member 80. For example, the heat insulation panel is disposed on the cross member 80, between the support frame 72a (72b) and the support frame 74a (74b) in a side view, and between the side frames 70a and 70b in a plan view. In this case, the second end region of the vibration reducing member 156, i.e., the damper cover 164b, the rubber damper 160b and the lid 166b are attached to the cross member 80, with the heat insulation panel in between.

It should be noted here that the vibration reducing member is not limited to the one in the preferred embodiments described above. For example, the vibration reducing member may have generally the same configuration as the mounting support 122a (122b) shown in FIG. 10A and FIG. 10B. In other words, the vibration reducing member may be provided by the mounting support 122a (122b) shown in FIG. 10A and FIG. 10B wherein the bolt 134 is replaced by, for example, a bracket portion (not illustrated) including a generally L-shaped section. In this case, for example, the bracket 132 of the vibration reducing member is connected to the bracket portion 110f (see FIG. 8 and FIG. 11B) of the cylinder head 110c or the head cover 110d of the engine 110 with fasteners (including bolts and nuts, for example), whereas the vibration reducing member's bracket portion which has a generally L-shaped section is connected to a bracket (not illustrated) which is provided on the cross member 80 with fasteners (including bolts and nuts, for example).

In the preferred embodiments described above, description was made for a case where the vehicle 10 includes a pair of rear wheels 14. However, the vehicle may include two or more pairs of rear wheels.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a pair of front wheels;
   at least a pair of rear wheels;
   a frame supported by the pair of front wheels and the pair of rear wheels;
   a seat supported by the frame;
   an engine including a crank shaft and a cylinder head, and disposed behind the seat;
   a mounting support provided between the engine and the frame, at a lower position that is lower than a center of the engine in an up-down direction; and
   a vibration reducer provided between the engine and the frame, at a higher position that is higher than the center of the engine in the up-down direction; wherein
   the vibration reducer is connected to the cylinder head.

2. A vehicle comprising:
   a pair of front wheels;
   at least a pair of rear wheels;
   a frame supported by the pair of front wheels and the pair of rear wheels;
   a seat supported by the frame;
   an engine including a crank shaft, a cylinder head, and a head cover, and disposed behind the seat;
   a mounting support provided between the engine and the frame, at a lower position that is lower than a center of the engine in an up-down direction; and
   a vibration reducer provided between the engine and the frame, at a higher position that is higher than the center of the engine in the up-down direction; wherein
   the vibration reducer is connected to the head cover.

3. A vehicle comprising:
a pair of front wheels;
at least a pair of rear wheels;
a frame supported by the pair of front wheels and the pair of rear wheels;
a seat supported by the frame;
an engine including a crank shaft and a cylinder head, and disposed behind the seat;
a mounting support provided between the engine and the frame, at a lower position that is lower than a center of the engine in an up-down direction; and
a vibration reducer provided between the engine and the frame, at a higher position that is higher than the center of the engine in the up-down direction; wherein
the vibration reducer includes a torque rod.

4. The vehicle according to claim 3, wherein
the seat includes a seat bottom including a seat surface, and a seat back portion including a backrest surface;
at least a portion of the engine is located at a position farther rearward than the seat back portion and higher than a lower end of the seat bottom when the vehicle is viewed from a side; and
the vibration reducer is disposed at a higher position than the lower end of the seat bottom.

5. The vehicle according to claim 3, wherein the engine is disposed to stride over a center in a width direction of the vehicle.

6. The vehicle according to claim 3, wherein the crank shaft is oriented in a width direction of the vehicle, and the cylinder head is tilted rearward.

7. The vehicle according to claim 3, wherein the frame includes a cross member extending in a width direction of the vehicle, and the vibration reducer is connected to the cross member.

8. The vehicle according to claim 3, wherein the torque rod extends in a direction perpendicular or substantially perpendicular to the crank shaft when the vehicle is viewed in a plan view.

9. The vehicle according to claim 3, further comprising a rubber damper provided at each end of the torque rod.

10. The vehicle according to claim 9, wherein the rubber damper includes a cylindrical damper having directionality.

11. The vehicle according to claim 9, wherein the rubber dampers provided at two respective ends of the torque rod include axes extending in different directions from each other.

12. The vehicle according to claim 3, further comprising a cargo bed, wherein the engine and the vibration reducer are below the cargo bed.

* * * * *